United States Patent [19]

Emmitte, Jr.

[11] Patent Number: 4,813,456
[45] Date of Patent: Mar. 21, 1989

[54] HYDRAULIC FLANGE SEAL CLAMP

[76] Inventor: John P. Emmitte, Jr., 725 Fm 1959 #912, Houston, Tex. 77034

[21] Appl. No.: 132,939

[22] Filed: Dec. 15, 1987

[51] Int. Cl.⁴ .............................................. F16L 55/10
[52] U.S. Cl. ....................................... 138/90; 138/89; 73/49.6
[58] Field of Search ............... 138/89, 90; 73/47, 49.6, 73/49.8; 220/235

[56] References Cited

U.S. PATENT DOCUMENTS

| | | | |
|---|---|---|---|
| 165,562 | 7/1875 | Gravelius . | |
| 405,054 | 6/1969 | Sexton | 138/90 |
| 522,137 | 6/1894 | Walker | 138/89 |
| 724,396 | 3/1903 | Pflugh | 220/25 |
| 810,390 | 1/1906 | Bode . | |
| 1,174,055 | 3/1916 | Carlson | 138/90 |
| 1,264,367 | 4/1918 | Conard | 138/90 |
| 1,649,994 | 11/1927 | Thal | 73/47 |
| 1,701,876 | 2/1929 | Fleming | 73/47 |
| 2,238,257 | 4/1941 | Fischer . | |
| 2,477,663 | 8/1949 | Sexton . | |
| 3,460,376 | 8/1969 | Kemp | 73/49.8 |
| 3,672,403 | 6/1972 | Wilson et al. | 138/89 |
| 3,914,966 | 10/1975 | Bello | 70/163 |
| 4,351,446 | 9/1982 | Madden | 220/210 |
| 4,719,687 | 1/1988 | Nammy | 138/89 |

FOREIGN PATENT DOCUMENTS 856592  11/1970  Canada ............................... 73/49.8

Primary Examiner—James E. Bryant, III
Attorney, Agent, or Firm—Ben D. Tobor

[57] ABSTRACT

A hydraulic flange seal clamp for sealing a flanged valve opening, to permit hydrostatic pressure testing of the valve, includes a pivotable connection structure between a seal member which overlies and seals the flanged opening, and a moveable piston which causes the seal member to assume the desired sealing relationship with the flanged valve opening.

7 Claims, 1 Drawing Sheet

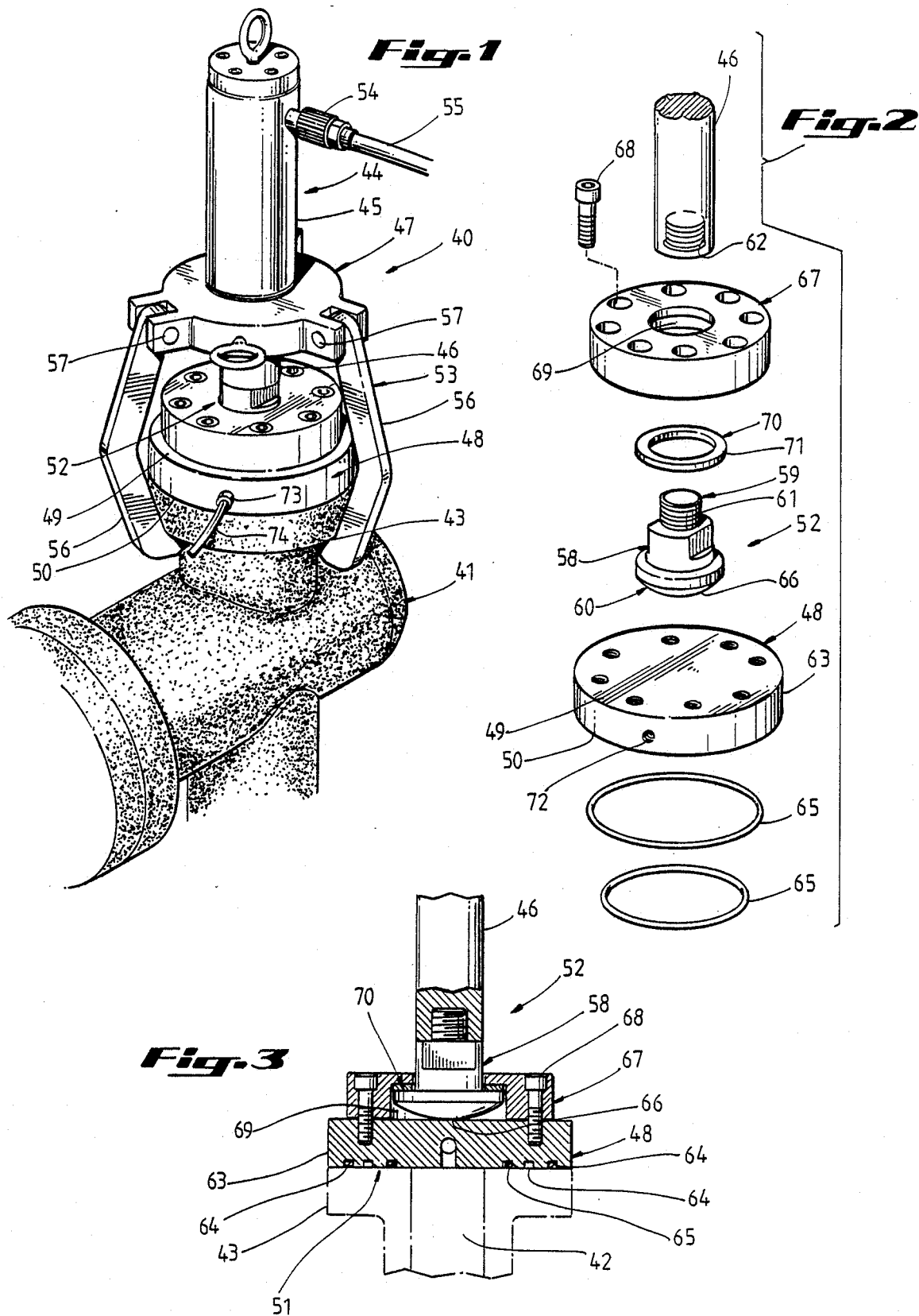

HYDRAULIC FLANGE SEAL CLAMP

FIELD OF THE INVENTION

The invention relates to a hydraulically operated flange seal clamp for sealing the open end of a valve, flange pipe, or other flanged fitting, to permit hydrostatic pressure testing of the valve, pipe, or other flanged fitting.

DESCRIPTION OF THE PRIOR ART

Hydraulically operated flange seal clamps have been in use for many years, in connection with performing hydrostatic pressure testing, and pneumatic testing of flanged valves, flanged pipe, or any type of flanged fittings. Typically, such flange seal clamps utilize a seal plate which seals against the opening surrounded by the flange of the particular valve, pipe, or fitting. A plurality of clamping arms, or hooks engage the underside of the particular flanged opening to be sealed, and the seal plate is forced into a sealing relationship with the flange, as by a hydraulic ram, or other suitable device.

In the case of hydraulically operated flange seal clamps, the piston of the hydraulic ram is typically, fixedly secured to the seal plate. A serious misalignment problem associated with such construction occurs due to either misalignment of the clamping arms on the underside of the flange, or varying thicknesses of the flange, or uneven wear and tear of the clamping arms. Inasmuch as once the particular flanged component has been sealed by the flange seal clamp, or a plurality thereof, the interior of the flanged valve, pipe, or fitting, may be pressurized to 10,000 psi. Accordingly, if the seal plate moves from the flange, serious safety problems can occur upon the release of such a high pressure force, as well as can affect the accuracy of the particular test being performed upon the flanged valve, pipe, or fitting. When such previously described misalignment occurs, the forces exerted by the piston against the seal member are not uniformly applied, and fracturing of the connection between the piston and the seal plate has occurred. Such fracturing requires the replacement of the piston and the seal member, so as to avoid the safety problems previously described.

Accordingly, prior to the development of the present invention, there has been no hydraulic flange seal clamp for sealing a flanged opening, to permit hydrostatic pressure testing, which is simple and economical to manufacture, is easily utilized, and avoids fracturing of clamp components due to misalignment of the hydraulic flange seal clamp with respect to the flange component to be tested. Therefore, the art has sought a hydraulic flange seal clamp for sealing a flanged opening, to permit hydrostatic testing, which is simple and economical to manufacture, is easily utilized, and prevents fracturing or damage to the hydraulic flange seal clamp.

SUMMARY OF THE INVENTION

In accordance with the invention, the foregoing advantages have been achieved through the present hydraulic flange seal clamp for sealing a flanged valve opening, to permit hydrostatic pressure testing of the valve. The present invention includes: a hydraulic ram, including a hydraulic cylinder and a moveable piston member, the hydraulic cylinder being fixedly secured to a body member; a seal member, having upper and lower ends, the lower end having a sealing surface associated therewith and adapted to overlie and seal the opening of the valve, the seal member being operatively associated with the piston member; means for pivotably connecting the upper end of the seal member to the moveable piston member; and means for restraining the movement of the body member with respect to the flanged valve opening, upon movement of the piston member and seal member, whereby the seal member bears against, and seals the flanged valve opening. A feature of the present invention is that the pivotable connection means may include an abutment member having first and second ends, the first end being fixedly secured to the piston member, and the second end pivotably abuts against the upper end of the seal member.

Another feature of the present invention is that the second end of the abutment member may have a spherical shaped bearing surface formed thereon, whereby the abutment member may pivot with respect to the seal member. An additional feature of the present invention is that an abutment member retainer member may be secured to the upper end of the seal member, the abutment member retainer member having a cavity formed therein for receiving the abutment member, and the abutment member retainer member may be disposed in a spaced relationship from the abutment member, whereby the abutment member can pivot with respect to the seal member within the abutment member retainer member.

The hydraulic flange seal clamp for sealing a flanged valve opening, to permit hydrostatic pressure testing of the valve, of the present invention, when compared with previously proposed prior art hydraulic flange seal clamps, has the advantages of being efficient and economical to manufacture and use, and prevents fracturing and damage to the hydraulic flange seal clamp.

BRIEF DESCRIPTION OF THE DRAWINGS

In the drawings:

FIG. 1 is perspective view of the hydraulic flange seal clamp of the present invention being used to seal a flanged valve openings;

FIG. 2 is a partial, exploded view of the hydraulic flange seal clamp of the present invention; and FIG. 3 is a partial, cross-sectional view of a portion of the hydraulic flange seal clamp of the present invention.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIG. 1, a hydraulic flange seal clamp 40, in accordance with the present invention is shown disposed upon a valve 41 having an opening 42 (FIG. 3) surrounded by a conventional flange 43. The use of the term "valve" throughout this description and claims is intended to relate to any valve, pipe, or any other type of fitting, wherein an opening, which is intended to be sealed, is surrounded by a flange 43. By sealing off the flanged valve opening 42, the valve 41 may be hydrostatically pressure tested, or pneumatically tested, as will be hereinafter described in further detail. Still with reference to FIG. 1, hydraulic flange seal clamp 40 of the present invention generally comprises: a hydraulic ram 44 including a hydraulic cylinder 45 and a moveable piston member 46, the hydraulic cylinder 45 being fixedly secured to a body member 47; a seal member 48, having upper and lower ends 49, 50, the lower end 50 having a sealing surface 51 (FIG. 3) associated therewith and adapted to overlie and seal the opening 42, the seal member 48 being operatively associated with the piston member 46; means for pivotably connecting 52 the upper end 49 of the seal member 48 to the moveable piston member 46; and means for restraining 53 the movement of the body member 47 with respect to the flanged valve opening 42, upon movement of the piston member 46 and the seal member 48, whereby the seal member 48 bears against, and seals, the flanged valve opening 42.

Still with reference to FIG. 1, hydraulic ram 44 may be preferably provided with a conventional hydraulic fluid coupler 54 which engages a conventional hydraulic hose 55. A conventional reservoir (not shown) and hydraulic pump (not shown) provides pressurized hydraulic fluid through hose 55 and coupler 54 into hydraulic ram 44 in a conventional manner to provide the desired movement of piston member 46. The restraining means 53 may preferably comprise at least two clamp arms 56 which are pivotably mounted to body member 47, as by pivot pins 57, and the clamp arms are adapted to engage beneath the flanged valve opening 42, as by contacting the underside of flange 43, in a conventional manner.

With reference now to FIGS. 2 and 3, the hydraulic flange seal clamp 40 of the present invention will be described in greater detail. The pivotable connection means 52 preferably includes an abutment member 58 having first and second ends 59, 60, the first end 59 being fixedly secured to the piston member 46, and the second end 60 pivotably abuts against the upper end 49 of the seal member 48. Preferably, abutment member 58 has a plurality of threads 61 formed at the first end 59, and threads 61 mate with internal threads 62 formed in piston member 46. Preferably, seal member 48 comprises a cylindrical, rigid seal plate 63 having a plurality of concentric grooves 64 formed in the lower end 50 of seal plate 63, and a plurality of O-rings 65 are disposed within the concentric grooves 64, whereby sealing surface 51 is provided on the lower end 50 of seal plate 63.

It should be apparent to one of ordinary skill in the art, that any type of seal member, or seal plate, could be utilized in the hydraulic flange seal clamp 40 of the present invention, provided the seal member has the requisite strength to withstand the particular hydrostatic test pressure utilized, as well as being able to withstand the forces exerted upon the seal member 48 by the abutment member 58, as will be hereinafter described in greater detail. It should be further noted that sealing surface 51 could be provided in any manner, provided the requisite seal is formed between the lower end 50 of seal member 48 and the flange 43 surrounding flanged valve opening 42.

Still with reference to FIGS. 2 and 3, the second end 50 of abutment member 58 preferably has a spherical shaped bearing surface 66 formed thereon, whereby the abutment member 58 may pivot with respect to the seal member 48, or the upper end 49 of seal plate 63. An abutment member retainer member 67 may be secured to the upper end 49 of seal member 48, as by a plurality of capscrews, or bolts, 68. The abutment member retainer member 67 preferably has a cavity 69 formed therein for receiving the abutment member 58. As seen in FIG. 3, the abutment member retainer member 67 is disposed in a spaced relationship from the abutment member 58, whereby the abutment member 58 can pivot with respect to the seal member 48 and the abutment member retainer member 67. A cushioning member 70, or flexible gasket 71 may be disposed between the abutment member 58 and the abutment member retainer member 67 so as to properly space the abutment member 58 within cavity 69 of abutment member retainer member 67 in a flexible manner.

After the hydraulic flange seal clamp 40 of the present invention is mounted upon valve 41 as shown in FIG. 1, including pressurizing hydraulic ram 44 to force seal member 48 into a sealing relationship with the flange 43 of flanged valve opening 42, via the pivotable connection means 52 between seal member 48 and piston 46, valve 41 is ready to be hydrostatically pressure tested, as well as may be pnuematically tested in the following manner. Once all the openings 42 have been sealed, pressurized fluid (not shown) may be pumped into the interior of valve 41. Preferably seal member 48 is provided with a fluid passageway 72 which is in fluid communication with the flanged valve opening 42, as seen in FIG. 3. The fluid passageway 72 may have associated therewith a conventional hydraulic connector 73 (FIG. 1) with which a high pressure hydraulic hose 74 may be associated, in a conventional manner.

It should be noted that if there is any variance in the thickness of flange 43, or uneven wear and tear in the clamp arms 56, or improper positioning of clamp arms 56 with the underside of flange 43, such misalignment could cause the longitudinal axis of the hydraulic cylinder 45 and piston 46 to not be perpendicular with respect to the seal member 48 or flange 43 of the valve 41. Whereas such misalignment would cause severs stresses at the point where a seal member would be rigidly secured and connected to piston 46, in the present invention the pivotable connection means 52 provides for, and compensates for, such misalignment and permits the force of the hydraulic ram 44 to be directly transferred to the seal member 48, without damaging the hydraulic flange seal clamp 40, and specifically prevents damage at the point where the seal member 48 is operatively associated with, or connected to, the piston 46.

It is to be understood that the invention is not limited to the exact details of construction, operation, exact materials or embodiments shown and described, as obvious modifications and equivalents will be apparent to one skilled in the art; for example, a ball and socket assembly could be utilized as the pivotable connection between the piston and the seal member, rather than an abutment member having a spherical bearing surface. Accordingly, the invention is therefore to be limited only by the scope of the appended claims.

I claim:

1. A hydraulic flange seal clamp for sealing a flanged valve opening, to permit hydrostatic pressure testing of the valve, comprising:
   a hydraulic ram, including a hydraulic cylinder and a moveable piston member, the hydraulic cylinder being fixedly secured to a body member;
   a seal member, having upper and lower ends, the lower end having a sealing surface associated therewith and adapted to overlie and seal the opening of the valve, the seal member being operatively associated with the piston member;
   means for pivotably connecting the upper end of the seal member to the moveable piston member, including an abutment member having first and second ends, the first end being fixedly secured to the piston member, and the second end pivotably abuts against the upper end of the seal member, the second end of the abutment member having a spherical shaped bearing surface formed thereon, whereby the abutment member may pivot with respect to the seal member; and means for restraining the movement of the body member with respect to the flanged valve opening, upon movement of the piston member and seal member, whereby the seal member bears against, and seals, the flanged valve opening.

2. The hydraulic flange seal clamp of claim 1, wherein the pivotable connection means includes an abutment member having first and second ends, the first end being fixedly secured to the piston member, and the second end pivotably abuts against the upper end of the seal member.

3. The hydraulic flange seal clamp of claim 1, wherein an abutment member retainer member is secured to the upper end of the seal member, the abutment member retainer member having a cavity formed therein for receiving the abutment member, and the abutment member retainer member is disposed in a spaced relationship from the abutment member, whereby the abutment member can pivot with respect to the seal member and the abutment member retainer member.

4. The hydraulic flange seal clamp of claim 3 wherein a cushioning member is disposed between the abutment member and the abutment member retainer member.

5. The hydraulic flange seal clamp of claim 4, wherein the cushioning member is a flexible gasket.

6. The hydraulic flange seal clamp of claim 1 wherein the restraining means comprises at least two clamp arms which are pivotably mounted to the body member, and are adapted to engage the flanged valve opening.

7. The hydraulic flange seal clamp of claim 1, wherein the seal member is provided with a fluid passageway in communication with the flanged valve openings.

* * * * *